United States Patent [19]

Haberey

[11] 4,138,236
[45] Feb. 6, 1979

[54] METHOD OF PERMANENTLY BONDING MAGNETIC CERAMICS

[76] Inventor: Florian Haberey, No. 264, Markstrasse, 4630 Bochum, Fed. Rep. of Germany

[21] Appl. No.: 858,222

[22] Filed: Dec. 7, 1977

[30] Foreign Application Priority Data

Dec. 8, 1976 [DE] Fed. Rep. of Germany ....... 2655480

[51] Int. Cl.$^2$ ............................................. C03C 27/00
[52] U.S. Cl. ........................................... 65/43; 29/603
[58] Field of Search ............................... 65/43; 29/603

[56] References Cited

U.S. PATENT DOCUMENTS 3,188,400  6/1965  Vilensky ................................ 29/603

*Primary Examiner*—Arthur D. Kellogg

*Attorney, Agent, or Firm*—John C. Smith, Jr.

[57] ABSTRACT

A method of bonding hard and/or soft magnetic ferrite parts comprises the steps of applying an oxide glass which contains iron oxide in an amount corresponding to about 50 to about 200% of the iron oxide proportion in the eutectic point of the respective glass-forming multi-component system, about 0.4 to about 0.8 mole percent of a wetting agent selected from the group consisting of $SiO_2$, $P_2O_5$ and $B_2O_3$ and about 0.1 to aout 0.4 mole percent of alkali oxides BaO, SrO, CaO, $K_2O$, $Na_2O$ and $Li_2O$ to at least one of the surfaces to be bonded together. The oxide glass may be applied prior to or after prefiring or main firing and the frit or the raw material weight-in quantity of the glass may be used. Finally, the ferrite parts are fused at temperatures in excess of the glass softening point.

7 Claims, No Drawings

METHOD OF PERMANENTLY BONDING MAGNETIC CERAMICS

BACKGROUND OF THE INVENTION

This invention relates to a method of permanently bonding hard and/or soft magnetic ferrite parts, the resulting bond being characterized by high temperature resistance and non-combustibility, low aging, good chemical resistance, high mechanical strength and hardness, avoiding of troublesome marginal layers, and economic producibility.

Ferrites are not able to readily be produced directly in large-volume workpieces. Industry therefore bonds together smaller ferrite parts into a larger workpiece by means of a plastic adhesive, upon requirement. The plastic adhesive spots, however, suffer the disadvantage over ceramics of a lesser temperature resistance (frequently, they are combustible), of an only limited chemical resistance relative to organic solvents, of a quicker aging and of a lesser mechanical strength and hardness, so that the bonded overall product has inferior properties as compared with pure ceramics. The applicability of bonded systems therefore is frequently limited.

SUMMARY OF THE INVENTION

It is the object of the present invention to eliminate these disadvantages and to provide an economic bonding system which permits a maintaining of the magnet ceramics specific advantageous properties also for larger workpieces. The use of a glass melt bond involves the problem that with the high temperature required for the melting process undesired chemical reactions occur readily between glass and magnetic ceramics which take e.g. the form of gas bubbles or non-magnetic marginal zones. Up to now, however, this problem could be solved only by a relatively complex processing involving among other things a melting in a non-oxidizing atmosphere. This processing thus requires an own additional heat treatment. A melt or fusion bond is of economic interest only then, however, when the melting of the glass can be coupled to the sintering process necessary for the production of polycrystalline ferrites, anyhow.

Herein, a method for the production of glasses is described with which the melt bond is able to be produced with the same process as conventional for prefiring or main firing of polycrystalline magnetic ceramics. The production of a melt bond may thus be effected for instance in that the workpieces to be bonded pass through the same continuous throughput furnace together with other workpieces to be sintered, it may even be done concurrently, while the workpieces to be bonded are prefired or are finally sintered.

Next to a bonding of ferrite parts into larger systems, it is frequently also desirous to not have to scrap parts which have cracked during firing. The invention provides an economic method to permanently mechanically bond ferrite parts separated by such cracks again in a further throughput.

According to the invention, it is provided for that a glass is used which already contains sufficient iron proportions. It is thereby achieved that no iron is withdrawn from the ferrite parts any more, the iron experiences no valency alteration and no new marginal phases result. It is thus avoided that the marginal zones of the ferrite parts to be bonded are subjected to an undesired chemical reaction. Thus, neither detrimental gas bubbles nor zones in the interface area occur which have a different chemical composition than the ferrite bodies.

Next to this specific property of a sufficient iron proportion, the chemical composition of the glass is provided in such a way that it is correlated to the cation types contained in ferrite.

The method of this invention is characterized by the use of a glass containing iron or iron oxides. The amount of iron corresponds to about 50 to about 200%, preferably 100% of the iron amount present in the eutectic point of the respective system. The proportion of iron ions may in part or entirely be replaced by substitution ions with a comparable ion radius; in particular $Fe_2O_3$ may be substituted by corresponding molar proportions of $Al_2O_3$, $Ga_2O_3$, $Cr_2O_3$, $Mn_2O_3$, $TiO_2$. The further components of the glass, i.e. wetting agents (e.g. $SiO_2$, $P_2O_5$, $B_2O_3$) and alkali proportions (e.g. BaO, SrO, CaO, $K_2O$, $Na_2O$, $Li_2O$) depend on the composition of the ferrite parts to be bonded together, the desired softening point and the thermal expansion coefficient, and applying the powder of this glass onto the surfaces of the ferrite parts to be bonded prior to or after the prefiring or main firing operation, the glass being able to be applied as frit or in raw material weight-in quantity both wet and dry, and subsequent fusion at elevated temperature.

EXAMPLE 1

Two parts of permanent-magnetic barium hexaferrite, e.g. $BaFe_{12}O_{19}$, are to be bonded permanently. For doing so, glass powder of a composition as set forth hereinafter is applied to the bonding surfaces of one of the ferrite parts. The glass powder may be applied as frit or in a stoichiometric weight-in quantity of the glass raw materials both sieved dry and wet. Thereafter, the second part is applied, pressed on or fit in, and the package is exposed to a temperature of about 1050° C. for instance for two hours. Treatment temperature and time are uncritical and may readily be adapted to circumstances.

The glass to be used has the following composition:
0.15 to 0.40 mole $BaCo_3$, preferably 0.30 mole;
0.40 to 0.80 mole $SiO_2$, preferably 0.58 mole;
0.05 to 0.25 mole $Fe_2O_3$, preferably 0.12 mole.

This weight-in quantity results in a barium iron silicate glass unknown up to now which has the properties necessary for the fusion of barium ferrites, in particular those of not altering the marginal zones of the bonding surfaces chemically during fusion and thus affecting the magnetic properties. This glass furthermore has a softening point which is sufficiently below the usual sintering temperature of the barium ferrite, and it displays an excellent wettability of the barium ferrite.

EXAMPLE 2

For a fusion of strontium hexaferrites, e.g. $SrFe_{12}O_{19}$, the procedure of EXAMPLE 1 is followed, but preferably $SrCO_3$ is used instead of $BaCO_3$ with the same molar composition. The fusion of barium and strontium ferrites is possible both by using $SrCO_3$ and $BaCO_3$ or a $SrCO_3/BaCO_3$ mixture.

Since, in practicing the invention, various changes and modifications may be made in the details exemplified, without departing from the spirit and scope of the invention, it is to be understood that it is not intended to limit the invention except as defined in the appended claims.

What is claimed is:

1. A method of bonding hard and/or soft magnetic ferrite parts together which comprises the steps of
   a. applying an oxide glass comprising iron oxide in an amount corresponding to about 50 to about 200% of the iron oxide proportion at the eutectic point of the respective glass-forming multi-component system, about 0.4 to about 0.8 mole of at least one wetting agent selected from the group consisting of $SiO_2$, $P_2O_5$ and $B_2O_3$ and about 0.1 to about 0.4 mole of at least one alkali oxide selected from the group consisting of BaO, SrO, CaO, $K_2O$, $Na_2O$ and $Li_2O$ to at least one of the surfaces that are to be bonded together of the ferrite parts prior to or after prefiring or main firing, said surfaces being provided with the frit or the raw material weight-in quantity of the oxide glass, and
   b. subsequently fusing the ferrite parts together at temperatures in excess of the glass softening point, the resulting bond being characterized by high temperature resistance and non-combustibility, low aging, good chemical resistance, high mechanical strength and hardness, avoiding of troublesome marginal layers, and economic producibility.

2. A method as set forth in claim 1, wherein the glass contains about 0.12 mole $Fe_2O_3$, about 0.58 mole $SiO_2$ and about 0.30 mole $BaCO_3$ or $SrCO_3$ and the fusing process is performed under normal atmosphere.

3. A method as set forth in claim 1, wherein the proportion of iron oxide is substituted at least partially by at least one oxide selected from the group consisting of $Al_2O_3$, $Ga_2O_3$, $Cr_2O_3$, $Mn_2O_3$ and $TiO_2$.

4. A method as set forth in claim 1, wherein the oxide glass contains iron oxide in an amount corresponding to about 100% of the iron oxide proportion in the eutectic point of the respective glass-forming multi-component system.

5. A method as set forth in claim 1, wherein said ferrite parts comprise barium or strontium hexaferrite and said glass comprises 0.15 to 0.40 mole of $BaCO_2$ or $SrCO_3$, 0.40 to 0.80 mole of $SiO_2$ and 0.05 to 0.25 mole of $Fe_2O_3$.

6. A method of bonding hard and/or soft magnetic ferrite parts together which comprises the steps of
   a. applying an oxide glass comprising at least one compound selected from the group consisting of iron oxide, $Al_2O_3$, $Ga_2O_3$, $Cr_2O_3$, $Mn_2O_3$ and $TiO_2$ in an amount corresponding to about 50 to about 200% of the iron oxide proportion at the eutectic point of the respective glass-forming multi-component system, about 0.4 to about 0.8 mole of at least one wetting agent selected from the group consisting of $SiO_2$, $P_2O_5$ and $B_2O_3$ and about 0.1 to about 0.4 mole of at least one alkali oxide selected from the group consisting of BaO, SrO, CaO, $K_2O$, $Na_2O$ and $Li_2O$ to at least one of the surfaces that are to be bonded together of the ferrite parts prior to or after prefiring or main firing, said surfaces being provided with the frit or the raw material weightin quantity of the oxide glass, and
   b. subsequently fusing the ferrite parts together at temperatures in excess of the glass softening point, the resulting bond being characterized by high temperature resistance and non-combustibility, low aging, good chemical resistance, high mechanical strength and hardness, avoiding of troublesome marginal layers, and economic producibility.

7. A method of bonding hard and/or soft magnetic ferrite parts together which comprises the steps of
   a. applying an oxide glass consisting of iron oxide in an amount corresponding to about 50 to about 200% of the iron oxide proportion at the eutectic point of the respective glassforming multi-component system, about 0.4 to about 0.8 mole of at least one wetting agent selected from the group consisting of $SiO_2$, $P_2O_5$ and $B_2O_3$ and about 0.1 to about 0.4 mole of at least one alkali oxide selected from the group consisting of BaO, SrO, CaO, $K_2O$, $Na_2O$ and $Li_2O$ to at least one of the surfaces that are to be bonded together of the ferrite parts prior to or after prefiring or main firing, said surfaces being provided with the frit or the raw material weight-in quantity of the oxide glass, and
   b. subsequently fusing the ferrite parts together at temperatures in excess of the glass softening point, the resulting bond being characterized by high temperature resistance and non-combustibility, low aging, good chemical resistance, high mechanical strength and hardness, avoiding of troublesome marginal layers, and economic producibility.

* * * * *